Sept. 30, 1958  D. S. DENCE  2,854,088
TRANSMISSION REMOTE CONTROL DEVICE FOR TILT CAB VEHICLES
Filed Dec. 7, 1955  3 Sheets-Sheet 1

INVENTOR.
DONALD S. DENCE
BY
ATTY.

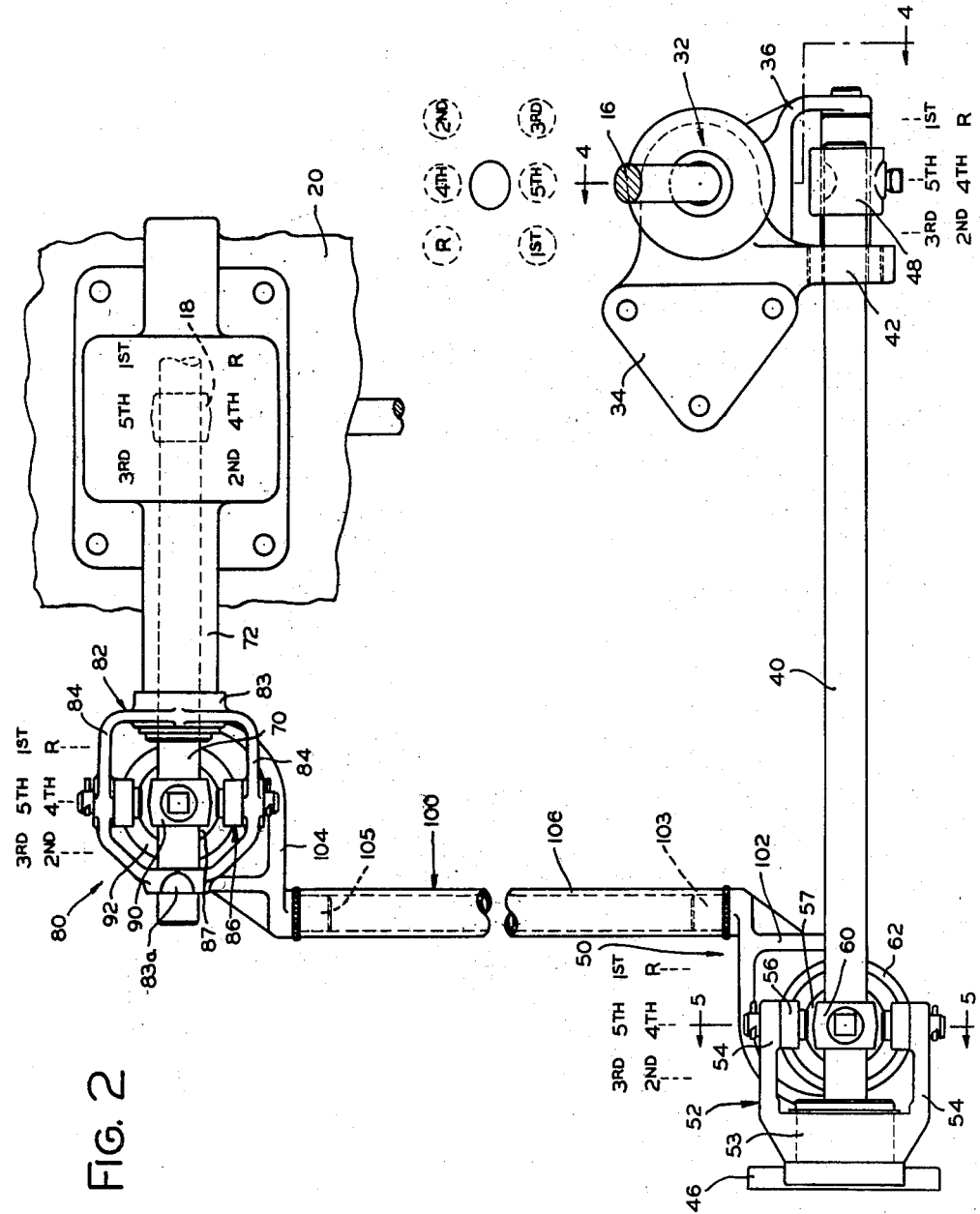

Sept. 30, 1958     D. S. DENCE     2,854,088
TRANSMISSION REMOTE CONTROL DEVICE FOR TILT CAB VEHICLES
Filed Dec. 7, 1955     3 Sheets-Sheet 3
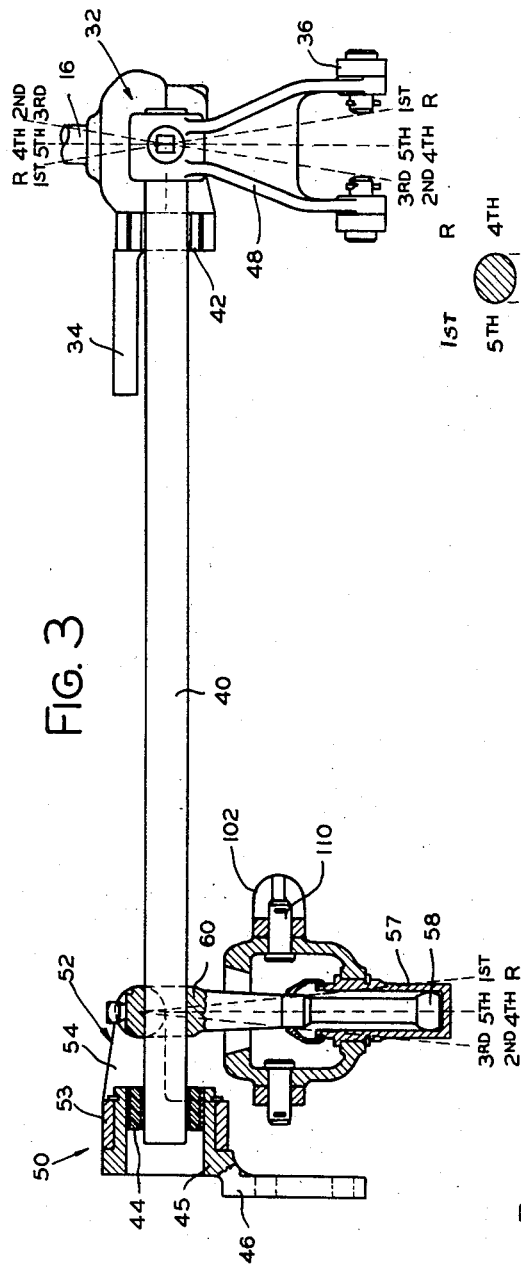
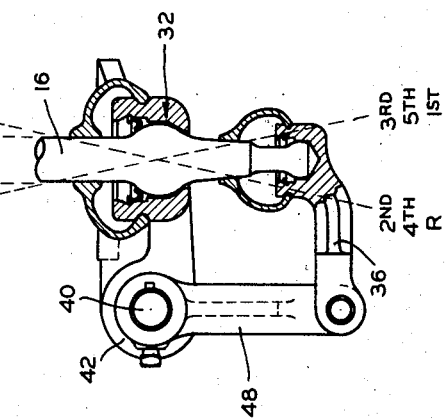
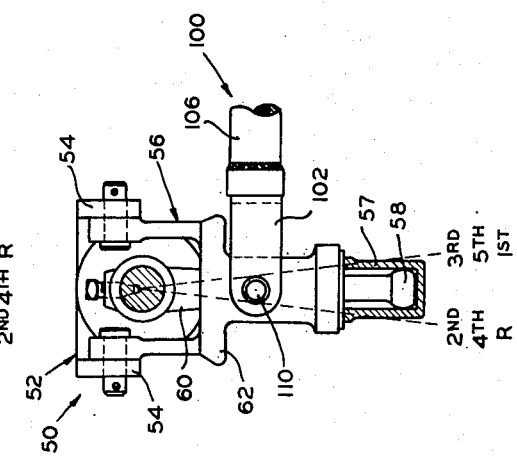
INVENTOR.
DONALD S. DENCE
BY
Brown, Jackson, Boettcher & Dienner
ATTY.

United States Patent Office 2,854,088
Patented Sept. 30, 1958

2,854,088

TRANSMISSION REMOTE CONTROL DEVICE FOR TILT CAB VEHICLES

Donald S. Dence, Jackson, Mich., assignor to Clark Equipment Company, a corporation of Michigan Application December 7, 1955, Serial No. 551,604

9 Claims. (Cl. 180—77)

The present invention relates to transmission remote control devices for tilt cab vehicles, and particularly, to motion transmitting means extending between the vehicle transmission and the shift lever in the cab of a tilt cab vehicle which accommodates tilting of the cab while maintaining operative connection between the shift lever and the transmission.

Tilt cab vehicles have met with wide acceptance in the art and comprise, essentially, a customary vehicle chassis on which is mounted the vehicle engine and change speed transmission, and a cab pivotally mounted on the chassis for tilting movement about an axis extending transversely of the chassis at the forward end thereof. The cab is normally locked to the chassis at its rearward end and is releasable to accommodate upward movement thereof to afford access, for the purpose of repair, to the vehicle engine. A shift lever for manually controlling the vehicle transmission is provided in the driver compartment of the cab and linkage means is provided operatively connecting the shift lever to the transmission. Heretofore, it has been necessary to disconnect the shift lever from the transmission in order to accommodate tilting of the cab. Obviously, such disconnection, and the subsequent reconnection, are troublesome and necessitate extra work and expenditure of time on the part of mechanics over and above that required to effect a specific repair. Further, because of the fact that the shift lever and transmission are disconnected during the repair period, operation of the transmission for test purposes during repair is rendered exceedingly difficult.

It is an object of the present invention to provide an improved transmission remote control device for tilt cab vehicles extending between the vehicle cab and transmission and accommodating tilting of the cab without necessitating disconnection of the shift lever and transmission, whereby at least the first stated disadvantage of prior devices is overcome.

Another object of the invention is to provide an improved remote control device of the character above defined maintaining operative connection between the shift lever and transmission and facilitating control of the transmission by the shift lever in all positions of the cab, whereby the disadvantages stated above are overcome.

It is also an object of the invention to provide an improved transmission remote control device for tilt cab vehicles accommodating tilting of the cab irrespective of the position of the shift lever and accommodating shifting of the lever to control the transmission irrespective of the position of the cab.

A further object of the invention is the provision of an improved transmission remote control device for tilt cab vehicles including means defining a pivot axis between the cab mounted parts and chassis mounted parts of the device that is substantially aligned with the pivot axis of the cab to accommodate relative movement of the two groups of parts without disturbing the operative connection therebetween upon tilting of the cab.

A still further object is the provision of an improved device of the character defined including a motion transmitting unit disposed between the cab mounted parts and chassis mounted parts of the device, said unit transmitting shift lever movements from the cab mounted parts to the chassis mounted parts and defining a pivot axis offset from and/or angularly related to the axis or axes of movement of the cab mounted parts so that said pivot axis does not interrupt or interfere with transmission of the said movements to the chassis mounted parts, said pivot axis substantially coinciding with the pivot axis of the cab to accommodate pivotal movement of the cab without disturbing the operative connection between the cab and chassis mounted parts.

A more specific object of the invention is the provision of an improved remote control device of the character defined comprising a movable shift lever in the vehicle cab, an oscillatable and reciprocable shaft actuated by the lever, the shaft being guided in fixed relation to the cab, a first rockable and swingable unit actuated by the shaft, the first unit including a pivot axis extending generally transversely of the vehicle chassis and being mounted on the cab with said pivot axis generally aligned with the pivot axis of the cab, a link extending between said first unit and a second similar unit, which is mounted on the chassis, said link being pivoted at one end on said pivot axis of said first unit and being pivoted at its other end on a parallel axis to said second unit, and a shaft extending between the second unit and the gear selecting member of the transmission. In use, the shaft actuated by the shift lever is oscillated and reciprocated by the lever to several positions to accommodate selection of any one of a number of transmission speed ratios. Oscillation and reciprocation of the shaft result, respectively, in rocking and swinging of the first unit, which movements are transmitted by the link to the second unit to rock and swing the second unit. The second unit, in turn, upon rocking and swinging, transmits to the shaft associated therewith oscillatory and reciprocatory movements, respectively, whereby the movements of the first shaft, and thus of the shift lever, are transmitted to the second shaft and the gear selecting member of the transmission as though the shift lever were directly connected to the gear selector. The pivot axis defined by the first unit is offset from the parallel to the rocking axis and offset from and at right angles to the swinging axis of the first unit. The pivot axis for the connecting link in the second unit is similarly located. Thus, the link pivots of said units in no way interrupt or interfere with transmission of rocking and swinging movement between said units. Yet, upon tilting of the cab, the cab pivots about an axis substantially coincident with the pivot axis of the first unit, so that cab movement has no practical effect on the relative disposition and operative connection of the units, whereby the various elements of the device remain operatively connected.

An additional object of the invention is the provision of an improved transmission remote control device for tilt cab vehicles of economical, efficient, long wearing and practical construction.

Other objects and advantages of the present invention will become apparent in the following detailed description of a preferred embodiment of the invention.

Now, in order to acquaint those skilled in the art with the manner of making and using the device of my invention, I shall describe, in connection with the accompanying drawings, a preferred embodiment of the invention and a preferred manner of making and using the same.

In the drawings:

Figure 2 is a plan view of the device of the invention as the same would be viewed by a person looking downwardly on the device from the front of the vehicle;

Figure 3 is a front view, partly in section and partly in elevation, of the cab mounted parts of the device;

Figure 4 is an end view, partly in section and partly in elevation, of the connection between the shift lever and the cab mounted shaft of the device, the view being taken substantially on line 4—4 of Figure 2; and Figure 5 is a vertical sectional view of the rockable and swingable unit mounted on the vehicle cab, the view being taken substantially on line 5—5 of Figure 2.

Figure 1:
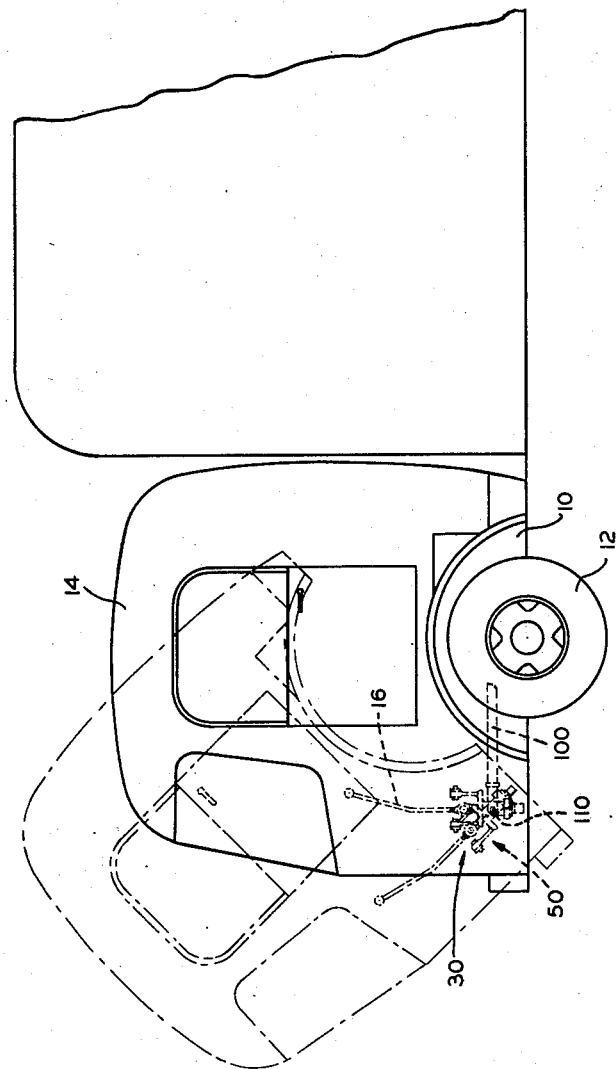
Figure 1 is a schematic side elevation of a tilt cab vehicle illustrating in solid and dotted lines the normal disposition of the cab and shift lever, and in dot-dash lines the tilted position of the cab and shift lever.

Referring now to the drawings, I have shown in Figure 1 a conventional tilt cab vehicle comprising a chassis 10, including wheels 12, on which is mounted a cab 14. The cab 14 is pivotally mounted on the chassis adjacent the front end of the vehicle for tilting movement, about the axis extending transversely of the chassis, from a normal position, shown in solid and dotted lines, to a tilted position, shown in dot-dash lines, wherein the cab is positioned to expose, for purposes of repair, the vehicle engine, steering mechanism, or other apparatus (not shown) mounted on or carried by the forward end of the chassis 10. The chassis 10 also has mounted thereon, in a conventional manner and at a conventional location, a change speed transmission (not shown in Figure 1), which transmission is controlled by means of a manually operable shift lever 16 mounted on the floor or deck of the cab 14. The shift lever 16, being connected to the cab, moves with the cab upon tilting the cab. Yet, the shift lever must have operative connection to the transmission. To provide an operative connection between the shift lever and transmission, and to accommodate tilting of the cab without necessitating disruption of the said connection, the present invention affords a novel remote control device, indicated generally at 30 in Figure 1.

The remote control device of the invention is shown in detail in Figures 2 to 5 as extending between and connecting the shift lever 16 and the gear selector 18 of the vehicle transmission 20. As shown, the shift lever 16 is preferably a lever of the first class having a universal ball and socket fulcrum at 32 in a bracket 34 secured to the lower side of the deck of the cab. The lever includes a long upper arm extending into the cab for manual actuation and a short lever arm extending below the cab deck and terminating in a ball portion fitting into the socket of a connecting link 36, suitable seals being provided at both ball and socket joints. As is known, the movements of the lower end of the lever are of less magnitude and are the inverse of the movements of the upper end of the lever. Accordingly, if the lower end of the shift lever were connected directly to the gear selector 18, the positions of the upper end of the lever in the vehicle cab would be the inverse of the various positions of the selector member 18 in affording a number of transmission speed ratios, and this relationship is therefore illustrated in the drawings, particularly Figure 2, the transmission as illustrated for purposes of this disclosure, and not as a limitation thereon, affording five forward speed ratios and one reverse speed ratio. As will become apparent as the description proceeds, the device of the invention imparts the same relationship between the shift lever and transmission as would exist if the same were directly connected.

As illustrated in Figure 2, the shift lever 16 is shiftable back and forth and from side to side with respect to the vehicle in an entirely conventional manner from a neutral position, shown in solid lines, to any one of 6 selective positions, illustrated in dotted lines, affording five forward speed ratios and one reverse speed ratio, which various selective positions of the shift lever 16 correspond to the selective positions shown for the selector member 18 in Figure 2. Movement of the shift lever in the manner defined results in various sliding, rocking and swinging movements of the control device of the invention, as is indicated in the drawings, and as will be described in greater detail hereinafter.

The embodiment of the invention selected for illustration herein comprises a first shaft 40 mounted on the cab, to the lower side of the deck thereof, for rotary and reciprocable movement. To mount the shaft for the movements defined, a sleeve bearing 42 is formed integrally with or secured to the shift lever bracket 34 and a similar bearing 44 is provided on a cylindrical bearing portion 45 of a mounting member 46 which is secured to the vehicle cab, the bearings supporting the shaft 40 in spaced parallel relation to the cab deck transversely of the vehicle chassis. Preferably, the bracket 34 includes a horizontal mounting surface for attachment directly to the deck of the cab, and the member 46 is provided with a vertical plate for attachment to a vertical surface of the cab base. At the end thereof adjacent the shift lever, the shaft 40 carries a depending crank arm 48 which may suitably be fixed to the shaft by a key and set screw as shown in Figure 4. At its lower end, the crank 48 is pivotally connected to the shift lever link 36, whereby the back and forth and side to side movements of the shift lever, in effecting gear shifting in a conventional manner, are transmitted to the shaft to result, respectively, in rocking or oscillation and sliding or reciprocation of the shaft, as will be appreciated from Figures 4 and 3, respectively.

At its outer end, the shaft 40 is operatively associated with a first motion translating means 50, preferably comprising a rockable and swingable unit formed in accordance with Patent No. 2,180,116, issued November 14, 1939, to Robert Lapsley. As shown in Figures 3 and 5, the unit 50 includes a rocking bracket 52 having a cylindrical portion 53 rotatably mounted on the bearing portion 45 of the mounting member 46 for rocking or oscillating movement about the fixed axis of movement of the shaft 40, the bracket also including a pair of arms 54 projecting parallel to the shaft 40 on opposite sides thereof. The arms 54 at their free ends define a pivot axis at right angles to, but not necessarily intersecting, the axis of movement of the shaft 40 and bracket 52, and a swinging movement 56 is pivoted to said arms for movement about said axis. The swinging member 56 includes a pair of arms disposed to opposite sides of and depending below the shaft 40, and a tubular end portion 57 defining a socket within which is conformably received the ball shaped lower end 58 of a crank arm 60. At its upper end, the arm 60 is fixedly secured to the shaft 40 by means of a set screw or the like.

In use, the reciprocating movement of the shaft 40 is transmitted by the arm 60 to the lower end of the swinging member 56 to move said end longitudinally of the shaft, whereupon the member 56 swings about the pivot axis defined by the arms 54 of the rocking bracket 52. When the shaft 40 is oscillated, the arm 60 transmits the movement to the lower end of the swinging member 56 to move said end transversely of the shaft, which movement is transmitted to the rocking bracket 52 whereupon the unit rocks or oscillates about the axis of the shaft. Thus, reciprocation and oscillation of the shaft 40 result, respectively, in swinging and rocking of the unit 50, particularly of the lower end 57 of the member 56.

In addition to the rocking bracket 52, swinging member 56 and arm 60, the unit 50 includes a ring member 62 journalled on the tubular end portion 57 of the swinging member 56, for a purpose to be described.

As previously observed, the vehicle transmission 20 may be mounted in a conventional manner on the chassis 10, and the same includes a gear selector member 18 by means of which the transmission speed ratio may be changed or the direction of drive may be reversed. The device of the invention includes, for purposes of actuating the selector 18, a second shaft 70 which is preferably disposed in spaced parallel relation to the shaft 40 and mounted in bearing means 72 on the transmission 20 for reciprocal and rocking movement, the selector 18 being fixed to the shaft. At its free end, the shaft 70 is operatively associated with a second translating means 80 complementary and preferably identical to the translating means 50. As shown, a second rockable and swingable unit is preferably provided, including a rocking bracket 82 having a cylindrical portion 83 rotatably mounted on an end portion of the bearing means 72, a swinging member 86 pivotally mounted by its arms on the arms 84 of the bracket 82, a crank arm 90 fixed to the shaft 70 and fitting, at its lower end, in the socket portion 87 of the swinging member 86. If desired, the bracket 82 may also include a bearing portion 83a engaging the outer end portion of the shaft 70.

From the foregoing, it is to be appreciated that the mounting means 34, link 36, shaft 40, mounting member 46, crank 48 and translating means 50 comprise the cab mounted parts of the device of the invention and that the shaft 70 and second translating means 80 comprise the chassis mounted parts. To connect the two groups of parts, while bearing in mind the object of accommodating tilting of the cab 14 with respect to the chassis 10 while maintaining operative drive connection between the shift lever 16 and the transmission selector member 18, I adopt a link 100 and pivotally connect the same at its opposite ends to the rotatable rings 62 and 92 of the translating units 50 and 80. As thus connected, the pivot axes of the link 100 are offset from and/or angularly related to the axis of movement of the adjacent shaft and the axes of rocking and swinging movement of the unit 50 or 80 on which the respective pivot axis is defined, so that the pivotal connections will not interfere with or interrupt the transmission of movement from the unit 50 to the unit 80. Accordingly, swinging and rocking of the unit 50, as such movements are transmitted to the unit 80 by the link 100, result in swinging and rocking, respectively, of the tubular portion 87 of the unit 80. Swinging and rocking of the member 87, as will be appreciated from the foregoing description of the first unit 50, are translated by the crank arm 90 to reciprocation and rocking, respectively, of the shaft 70, whereby the shaft 70 substantially duplicates the movements of the shaft 40 to actuate the selector member 18 in the same manner as though the shift lever 16 were directly connected to the selector.

As shown in Figure 2, I prefer to dispose the shafts 40 and 70 transversely of the vehicle parallel to one another, but the spacing therebetween may be varied as necessary in any given vehicle. To accommodate variation in the spacing of the shafts, the link 100 is preferably comprised of a pair of clevises 102 and 104 of identical structure, pivotally connected, respectively, to the rings 62 and 92 of the translating units 50 and 80, and a tubular connector 106 secured at its opposite ends to the clevises, the connector 106 being of whatever length may be required by the spacing of the shafts. Preferably, each clevis includes a cylindrical stub 103 and 105, respectively, offset from the longitudinal axis of the clevis for the reception of the connector 106, the offsetting of the stubs accommodating alignment or offsetting of the translating units, an offset relationship being shown in Figure 2. Moreover, the rockable and swingable units adopted as the translating means of the structure of the invention accommodate offsetting, both horizontal and vertical, of the shafts 40 and 70 and translating units 50 and 80, and also accommodate disposition of the shafts in angular relation to one another. Due to the provision in each unit of four axes of movement, i. e., the axis of rotation of the rocking bracket, the pivot axis of the swinging member, the axis of rotation of the ring and the pivot axis of the clevis of the link 100, and the offsetting of the shaft axis and the pivot connection of the link, each rockable and swingable unit is adapted to perform a true translating function substantially irrespective of the relative locations of the shaft and link. Accordingly, it is to be appreciated that the assembly shown is fully capable of filling a wide variety of transmission remote control requirements involving various relationships of the shift lever and transmission selector member.

Irrespective of the relative disposition of the various elements of the device of the invention, it is the object of the invention to accomodate tilting of the vehicle cab without necessitating disconnection of the control elements and without disturbing the relation of the elements, and yet maintaining the operative connection between the elements and accommodating operation of the device in a normal manner irrespective of the position of the cab on the chassis. To this end, I dispose a pivot axis between the cab and the chassis mounted parts or elements of the device substantially coincident with the axis of tilting movement of the cab. Specifically, the pivotal connections of the clevises 102 and 104 to the swingable and rockable units of the device each define a pivot axis that is not directly involved in the translating function and that is provided between the cab and chassis mounted parts of the device. According to the present invention, one of these pivot axes, in the neutral position of the shift lever and transmission, is aligned with or disposed coincident with the tilting axis of the cab, whereby tilting of the cab takes place about the pivot axis of the link 100 without exerting any force upon or control over the control device. Moreover, even when the translating means are rocked and/or swung out of neutral position, the said pivot axis is still substantially aligned or coincident with the tilting axis of the cab (the movements of the elements upon gear shifting being relatively slight) so that the cab still tilts substantially about the one pivot axis of the device; the translating units, the link and the pivotal connections thereof readily accommodating any slight movements that may be necessary in the device due to offset and/or angular relation of the one pivot axis to the tilting axis of the cab. Accordingly, even in the tilted position of the cab, there is no binding of the elements of the device and no obstruction to their movement, so that the transmission may be controlled by the shift lever in the same manner as though the cab were not tilted. It is to be appreciated, therefore, that the present invention specifically satisfies the objects set forth hereinbefore and affords a transmission control device accommodating tilting of the cab with respect to the vehicle chassis while maintaining operative connection between the shift lever and the transmission, and facilitating control of the transmission by the shift lever irrespective of the position of the cab on the chassis.

In the preferred embodiment of the device as disclosed herein, the pivot axis of the link 100 on the cab mounted translating unit 50 is aligned with the tilting axis of the cab, as is indicated at 110 in Figure 1, the tilting axis also being indicated at 110 in Figures 3 and 5.

While I have described what I regard to be a preferred embodiment of my invention, it is to be appreciated that various changes, rearrangements and modifications may be made therein without departing from the scope of the invention, as defined by the appended claims.

I claim:

1. In a tilt cab vehicle having a chassis, a change speed transmission mounted on the chassis, a cab tiltably mounted on the chassis, and a shift lever in the cab for controlling the transmission; a device operatively connecting the shift lever and transmission comprising a rockable and swingable unit operatively connected to the shift lever and mounted on the cab, and a motion transmitting member pivotally connected to said unit on a pivot axis offset from the axes of rocking and swinging movement of the unit, the said pivot axis of said member being aligned substantially with the axis of tilting movement of the cab, said member being operatively connected to the transmission.

2. In a tilt cab vehicle having a chassis, a change speed transmission mounted on the chassis, a cab tiltably mounted on the chassis and a shift lever in the cab for controlling the transmission; a device operatively connecting the shift lever and transmission comprising a first rockable and swingable unit operatively connected to the shift lever and mounted on the cab, a second rockable and swingable unit operatively connected to the transmission and mounted on the chassis, and motion transmitting means pivotally connected adjacent one end thereof to one of said units on a pivot axis offset from the axes of rocking and swinging movement of said one unit and pivotally connected adjacent the other end thereof to the other of said units on a pivot axis offset from the axes of rocking and swinging movement of said other unit, one of said pivot axes being aligned substantially with the axis of tilting movement of the cab.

3. In a tilt cab vehicle having a chassis, a change speed transmission mounted on the chassis, a cab tiltably mounted on the chassis and a shift lever in the cab for controlling the transmission; a device operatively connecting the shift lever and transmission comprising a first rockable and swingable unit operatively connected to the shift lever and mounted on the cab, a second rockable and swingable unit operatively connected to the transmission and mounted on the chassis, and a link connecting said units, said link being pivotally connected adjacent its opposite ends to said units on pivot axes offset from the axes of rocking and swinging movement of the respective unit, one of said pivot axes being aligned substantially with the axis of tilting movement of the cab, said link, said units and the pivotal connections thereof accommodating tilting movement of the cab while maintaining operative connection between the shift lever and the transmission.

4. In a tilt cab vehicle having a chassis, a change speed transmission mounted on the chassis, a cab tiltably mounted on the chassis and a shift lever in the cab for controlling the transmission; a device operatively connecting the shift lever and transmission comprising a first shaft operatively connected to the shift lever and mounted on the cab for movement on a fixed axis in relation to the cab, a second shaft operatively connected to the transmission and mounted on the chassis for movement on a fixed axis in relation to the chassis, complementary motion translating means operatively connected to each of said shafts and mounted, respectively, on the cab and the chassis, and a link connecting said translating means, said link adjacent one end thereof being pivotally connected to one of said translating means on a pivot axis offset from the axis of movement of the respective shaft and transverse of said link, said link adjacent the opposite end thereof being pivotally connected to the other of said translating means on a pivot axis offset from the axis of movement of the other shaft and transverse of said link, one of said pivot axes being aligned substantially with the axis of tilting movement of the cab, said link and said translating means accommodating tilting of the cab while maintaining operative connection between the shift lever and the transmission.

5. In a tilt cab vehicle having a chassis, a change speed transmission mounted on the chassis, a cab tiltably mounted on the chassis and a shift lever in the cab for controlling the transmission; a device operatively connecting the shift lever and transmission comprising a first shaft reciprocably and rockably mounted on the cab for movement along and about a fixed axis, said first shaft being operatively connected to the shift lever to be rocked and reciprocated thereby, a second shaft reciprocably and rockably mounted on the chassis for movement along and about a fixed axis remotely of the axis of movement of said first shaft, said second shaft being operatively connected to the transmission, a first rockable and swingable unit mounted on the cab and connected to said first shaft to be rocked and swung, respectively, upon rocking and reciprocating movement of said first shaft, a link pivotally connected to said first unit in offset relation to the axis of movement of said first shaft and the axes of rocking and swinging movement of said unit, said first unit being mounted on said cab with the pivot axis of said link aligned, in the neutral position of the shift lever and transmission, with the axis of tilting movement of the cab, and a second rockable and swingable unit mounted on the chassis and connected to said second shaft, said link being pivotally connected to said second unit in offset relation to the axis of movement of said second shaft and the axes of rocking and swinging movement of said second unit to transmit to said second unit the rocking and swinging movement of said first unit, said second unit upon rocking and swinging, respectively, rocking and reciprocating said second shaft, whereby said second shaft duplicates the movement of said first shaft to transmit to the transmission the movement of the shift lever, the pivot axis of said link on said first unit being substantially aligned with the axis of tilting movement of the cab in all positions of said shafts and said units, said units, said link and the pivotal connections thereof accommodating tilting movement of the cab without disturbing the connections of said shafts and said units, whereby the device maintains operative connection between the shift lever and the transmission in all positions of the cab with respect to the chassis.

6. A transmission remote control device for tilt cab vehicles having a chassis, a change speed transmission mounted on the chassis, a cab tiltably mounted on the chassis and a shift lever in the cab for controlling the transmission; said device comprising a first shaft reciprocably and rockably mounted on the cab for movement along and about a fixed axis, link and crank means connecting said first shaft and the shift lever to rock and reciprocate said first shaft upon appropriate movement of the shift lever, a second shaft reciprocably and rockably mounted on the chassis for movement along and about a fixed axis, said second shaft being operatively connected to the transmission, a first rockable and swingable unit mounted on the cab and connected to said first shaft, a second rockable and swingable unit mounted on the chassis and connected to said second shaft, each of said units comprising a rocking bracket mounted for movement about the axis of movement of the respective shaft, a swinging member pivotally supported on said rocking bracket for movement about an axis at right angles to the axis of movement of the respective shaft, an arm fixedly secured to the respective shaft, means carried at one end of said swinging member for receiving the outer end of said arm and a ring member journalled on one end of said swinging member, said arm connecting the respective shaft and said swinging member to correlate swinging movement of said swinging member to reciprocal movement of the shaft and rocking movement of said swinging member and rocking bracket to rocking movement of the shaft, and a link pivotally connected at its opposite ends to said ring member of each of said units, said link interconnecting said units for simultaneous rocking and swinging movements, whereby the movements of said first shaft are duplicated by said second shaft to transmit the movements of the shift lever to the transmission, one of the pivot axes of said link being aligned substantially with the axis of tilting movement of the cab, said units, said link and the pivotal connections thereof accommodating tilting movement of the cab while maintaining operative connection between the shift lever and the transmission.

7. In a tilt cab vehicle having a chassis, a change speed transmission mounted on the chassis, a cab tiltably mounted on the chassis, a shift lever in the cab for controlling the transmission, and motion transmitting means extending between and operatively connecting the shift lever and the transmission; the improvement comprising a shift lever mounted on the cab in predetermined relation to the cab for tilting movement with the cab in said predetermined relation thereto, and motion transmitting means between said shift lever and the transmission including a pivotal connection having its axis aligned substantially with the axis of tilting movement of the cab to accommodate tilting of the cab while maintaining the operative connection between the shift lever and the transmission and the said predetermined relation between the shift lever and the cab.

8. In a tilt cab vehicle having a chassis, a change speed transmission mounted on the chassis, a cab tiltably mounted on the chassis, a shift lever in the cab for controlling the transmission, and motion transmitting means extending between and operatively connecting the shift lever and the transmission; the improvement comprising motion transmitting means including a link pivotally connected with respect to the shift lever and pivotally connected with respect to the transmission and having one of its pivot axes aligned substantially with the axis of tilting movement of the cab, and a shift lever mounted on the cab in predetermined relation thereto and connected to the chassis solely by said link, whereby said shift lever is tiltable with the cab about said one pivot axis of said link and the axis of tilting movement of the cab without changing the predetermined relation between the shift lever and the cab and the operative connection between the shift lever and the transmission.

9. In a tilt cab vehicle having a chassis, a change speed transmission mounted on the chassis, a cab tiltably mounted on the chassis, a shift lever in the cab for controlling the transmission, and motion transmitting means extending between and operatively connecting the shift lever and the transmission; the improvement comprising motion transmitting means including a link pivotally connected with respect to the shift lever on a pivot axis substantially coinciding with the axis of tilting movement of the cab, and a shift lever mounted on the cab at a point fixed relative to the cab for tilting movement conjointly with the cab about said pivot axis of said link and the axis of tilting movement of the cab, whereby the cab is tiltable relative to the chassis without changing the relationship of the shift lever relative to the cab, the operative connection between the shift lever and the transmission, and the relative dispositions of the shift lever and a selector member associated with the transmission.

References Cited in the file of this patent

UNITED STATES PATENTS

| | | |
|---|---|---|
| 2,018,023 | Kliesrath | Oct. 22, 1935 |
| 2,191,543 | Osborne | Feb. 27, 1940 |
| 2,205,589 | Bixby | June 25, 1940 |
| 2,740,487 | Murty et al. | Apr. 3, 1956 |